United States Patent
Ono et al.

(10) Patent No.: US 7,500,632 B2
(45) Date of Patent: Mar. 10, 2009

(54) SEAT BELT DEVICE

(75) Inventors: Katsuyasu Ono, Kanagawa (JP);
Sadanori Ohsumi, Kanagawa (JP);
Masuo Matsuki, Kanagawa (JP);
Kiyoshi Ogawa, Kanagawa (JP)

(73) Assignee: NSK Autoliv Co., Ltd., Kanagawa (JP)

( * ) Notice: Subject to any disclaimer, the term of this patent is extended or adjusted under 35 U.S.C. 154(b) by 653 days.

(21) Appl. No.: 10/100,015

(22) Filed: Mar. 19, 2002

(65) Prior Publication Data

US 2002/0134876 A1    Sep. 26, 2002

(30) Foreign Application Priority Data

Mar. 22, 2001   (JP)   ............... P.2001-083131

(51) Int. Cl.
*B60R 22/46*   (2006.01)
(52) U.S. Cl. .................... 242/374; 60/632
(58) Field of Classification Search .......... 242/374, 242/390.5, 390.6; 297/478; 280/806, 807; 60/632
See application file for complete search history.

(56) References Cited

U.S. PATENT DOCUMENTS

| | | | | |
|---|---|---|---|---|
| 3,871,683 A | * | 3/1975 | Otani | ............... 297/480 |
| 3,896,621 A | * | 7/1975 | Sawyer | ............... 60/635 |
| 3,901,035 A | * | 8/1975 | Haraikawa | ............... 60/636 |
| 4,927,175 A | | 5/1990 | Fohl | |
| 5,450,723 A | * | 9/1995 | Fohl | ............... 60/638 |
| 5,842,344 A | | 12/1998 | Schmid | |
| 5,956,954 A | * | 9/1999 | Schmid | ............... 60/636 |
| 6,017,060 A | * | 1/2000 | Wilson et al. | ............... 280/806 |
| 6,299,090 B1 | * | 10/2001 | Specht et al. | ............... 242/374 |
| 6,340,176 B1 | * | 1/2002 | Webber et al. | ............... 280/806 |
| 6,343,758 B1 | | 2/2002 | Abe et al. | |

FOREIGN PATENT DOCUMENTS

| | | | |
|---|---|---|---|
| DE | 4227781 A1 | * | 2/1994 |
| EP | 980799 A2 | | 2/2000 |
| JP | 2-147457 B1 | | 6/1990 |
| JP | 9-188223 B1 | | 7/1997 |
| JP | 10-67300 A | | 3/1998 |
| JP | 2000-313312 A | | 11/2000 |
| JP | 2001-063519 B1 | | 3/2001 |
| JP | 2001-063520 B1 | | 3/2001 |

* cited by examiner

*Primary Examiner*—Peter M Cuomo
*Assistant Examiner*—Scott Haugland
(74) *Attorney, Agent, or Firm*—Sughrue Mion, PLLC

(57) ABSTRACT

A seat belt device has a gas generator for generating a high pressure gas when the vehicle is in emergency, a cylinder for conducting the high pressure gas from the gas generator, a piston received movably within the cylinder and pressed and moved by the high pressure gas, and a drive unit for rotating a winding shaft of a seat belt retractor in a direction of removing the slack of a belt, using the movement of the piston, wherein the pretensioner is employed with the energy absorbing mechanism, for reversely rotating the winding shaft if a tension acting on the belt exceeds a predetermined value after removing the slack of the belt.

12 Claims, 5 Drawing Sheets

SEAT BELT DEVICE

BACKGROUND OF THE INVENTION

The present invention relates to a seat belt device having a retractor, and more particularly to a seat belt device equipped with a pretensioner for rotating a winding shaft of the retractor in a direction of removing a slack of the belt.

Conventionally, some retractors for the seat belt device can remove the slack of the belt (webbing) by means of the pretensioner, when the vehicle is in emergency such as collision. Also, other retractors have an energy absorbing mechanism for absorbing an impact on the body of the crew by letting out a predetermined amount of the belt, when a load acting on the belt exceeds a predetermined value after removing the slack of the belt by the pretensioner.

In JP-A-9-188223, a linear drive device (pretensioner) was disclosed, comprising a cylindrical tube, a piston having a hollow inner space and an end wall at one end portion in an axial direction to be slidable within the cylindrical tube, and a charge for subjecting the inner space of the piston to a high pressure gas after ignited, in which a passage opening (vent hole) is provided through the end wall and closed by a blow-by patch.

In this linear drive device, the piston is slid through the cylindrical tube by its high pressure gas when the charge is ignited, and the winding shaft of the retractor is rotated in a direction of removing the slack of the belt owing to a movement of the position. Thereafter, the winding shaft of the retractor is rotated reversely by activation of the energy absorbing mechanism. At this time, the piston is moved through the cylindrical tube against a pressure (residual pressure) of the high pressure gas in an opposite direction to the movement direction when the charge is ignited. That is, the piston further compresses the high pressure gas. Thus, the blow-by patch provided in the piston is broken or removed to exhaust the gas through the passage opening. Or the gas is exhausted through an exhaust opening provided in the blow-by patch.

In the case where there is no vent hole, the residual pressure is compressed by activation of the energy absorbing mechanism after the pretensioner is activated.

Therefore, an absorbed energy in the energy absorbing mechanism may be added to an energy for compressing the residual pressure of the pretensioner.

Furthermore, the pretensioner has generally a shorter activation stroke than the energy absorbing mechanism.

Hence, it is necessary to separate the pretensioner at a pretensioner stroke end, with no pressure added to the compression energy of the pretensioner, whereby the energy absorption amount has steps.

Since the residual pressure is further compressed, it is required to increase the pressure resistance of a pressure vessel.

To improve the above problems, a mechanism for releasing the blow-by patch at a predetermined pressure was disclosed in JP-A-9-188223. However, with this method, when the blow-by patch is released, the pressure is released literally, causing a sudden change.

In the case where the blow-by patch having a small hole is employed as disclosed in the above patent, a combustion gas can be vented gradually. However, if the blow-by patch is released, a sudden change occurs.

Also, if the hole diameter is greater not to release the blow-by patch, the venting is increased, producing a greater pressure loss when the pretensioner is activated.

Therefore, the design redundancy is reduced for making the pretensioner performance and the stability at the time of energy consumption consistent

SUMMARY OF THE INVENTION

This design redundancy is secured by changing the venting characteristic.

It is ideal that the venting characteristic is smaller when the pretensioner is activated, while the venting characteristic is greater and smoother at the time of energy absorption.

Therefore, it is an object of the present invention to provide a seat belt device in which the diameter of a vent hole is made smaller at first to reduce a pressure loss when the pretensioner is activated. Then, the gas is vented gradually and large amount by the diameter of the vent hole is expanded, since a high temperature combustion gas passes through a capillary.

It is an object of the present invention to provide a seat belt device comprising: a gas generator for generating a high pressure gas when a vehicle is in emergency; a cylinder for conducting the high pressure gas from the gas generator; a piston received movably within the cylinder and pressed and moved by the high pressure gas; and a drive unit for rotating a winding shaft of a seat belt retractor in a direction of removing a slack of a belt, using the movement of the piston; pretensioner employed with an energy absorbing mechanism, for reversely rotating the winding shaft when a tension acting on the belt exceeds a predetermined value after removing the slack of the belt; and a venting mechanism having a gas passageway for exhausting the high pressure gas from a space filled with the high pressure gas to the outside of the space, wherein at least a part of the gas passageway is expanded as the high pressure gas is exhausted.

Herein, the gas passageway may be provided in the piston or the cylinder. The form of the gas passageway is not specifically limited, but may be formed so as to exhaust the high pressure gas from the space filled with high pressure gas to the outside. In addition, apart or total of the gas passageway in a length direction thereof may be expanded, while the high pressure gas is exhausted.

With the above seat belt device, when the pretensioner is activated, the amount of high pressure gas exhausted from the gas passageway can be reduced, since the gas passageway is narrow. On the other hand, when the energy absorbing mechanism is activated, since the gas passageway is expanded, the high pressure gas can be exhausted efficiently from the gas passageway. That is, when the pretensioner is activated, the slack of the belt can be removed rapidly, while when the energy absorbing mechanism is activated, the belt can be let out smoothly according to a load applied on the belt. With this constitution, the device does not have a larger size and a complex structure. Therefore, the optimal design can be easily made for each type of vehicle with various variations, including changing the shape or size of the gas passageway and changing the position of the gas passageway.

In the above constitution, the gas passageway is partitioned by a deformable member at: least a part of which melts or breaks away as the high pressure gas is exhausted. A total or only a part of the gas passageway may be partitioned (enclosed) circumferentially by the deformable member. Also, only a part of the gas passageway may be partitioned in its length direction by the deformable member. The materials of the deformable member may be easily meltable with high temperature and high pressure gas, including resin and aluminum, but are not specifically limited. With this constitution, no actuator is necessary to expand the gas passageway, whereby the secure operation can be achieved at lower costs.

Various variations of the seat belt device can be attained by changing the shape or size of the deformable member.

Also, in this constitution, the venting mechanism has preferably an auxiliary space, wherein the auxiliary space is cut off from the gas passageway before expansion of the gas passageway, and communicates with the gas passageway as expanding of the gas passageway. The auxiliary space may be in communication with the outside, before communicating with the gas passageway, or a so-called auxiliary passageway. With this constitution, the exhaust of high pressure gas can be promoted when the energy absorbing mechanism is activated. Therefore, more variations of the seat belt device can be made by changing the shape or size of the auxiliary space.

Also, in the above constitution, the venting mechanism has a deformable member provided with a first gas passageway that is expanded as the high pressure gas is exhausted, and a non-deformable member provided with a second gas passageway that remains an initial size of the second gas passageway as the high pressure gas is exhausted.

In addition to this, the piston has the deformable member and the non-deformable member, wherein the first gas passageway and the second gas passageway extending on the same straight line to penetrate the piston along a movement direction of the piston.

An initial size of the first gas passageway is narrower than a size of the second gas passageway before the first gas passageway is expanded.

Furthermore, at least a part of the deformable member is fitted into the inside of the non-deformable member.

DESCRIPTION OF THE PREFERRED EMBODIMENTS

Figure 1:
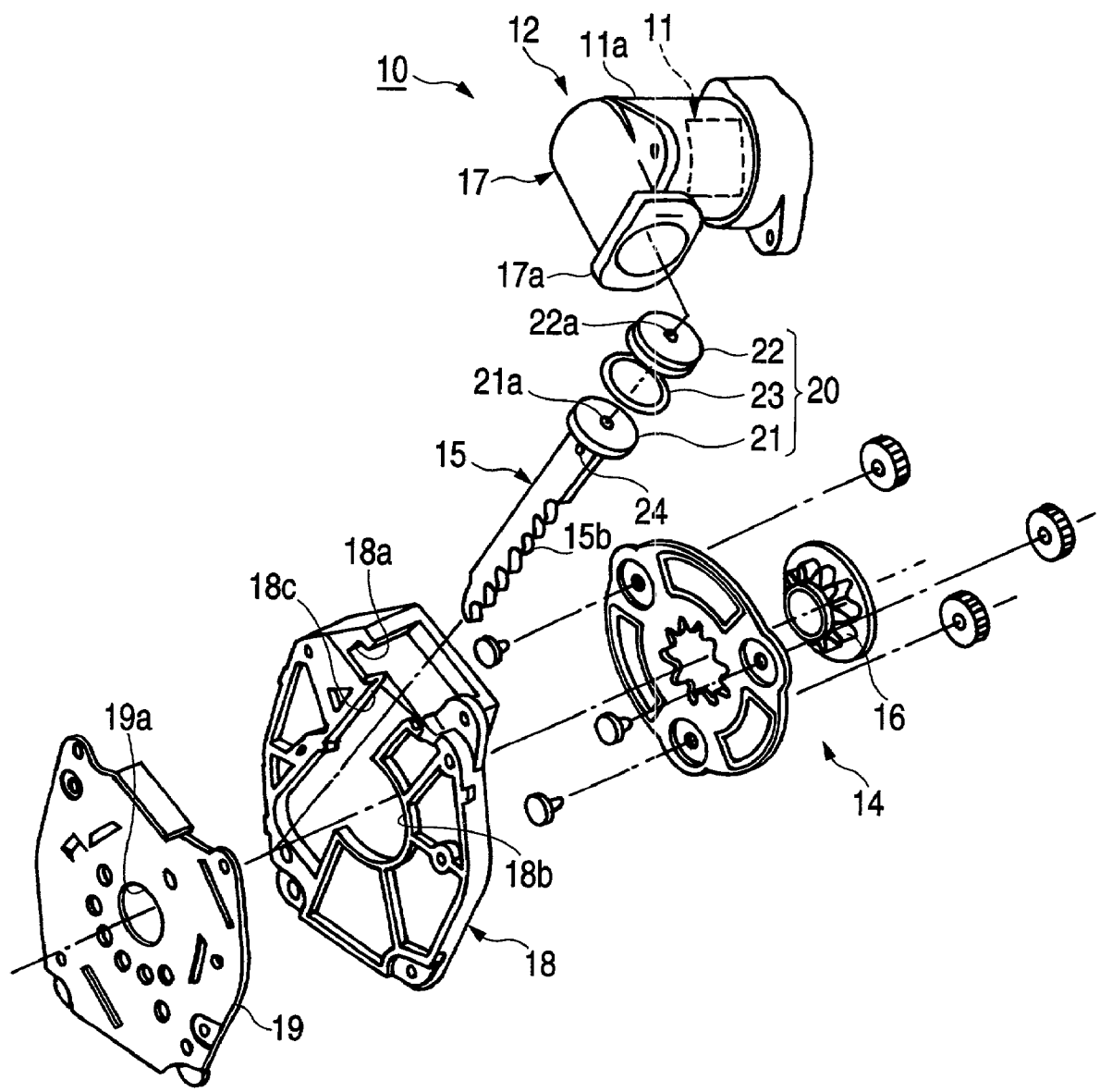
FIG. 1 is an exploded perspective view of a pretensioner according to a first embodiment of the present invention.
Figure 2:
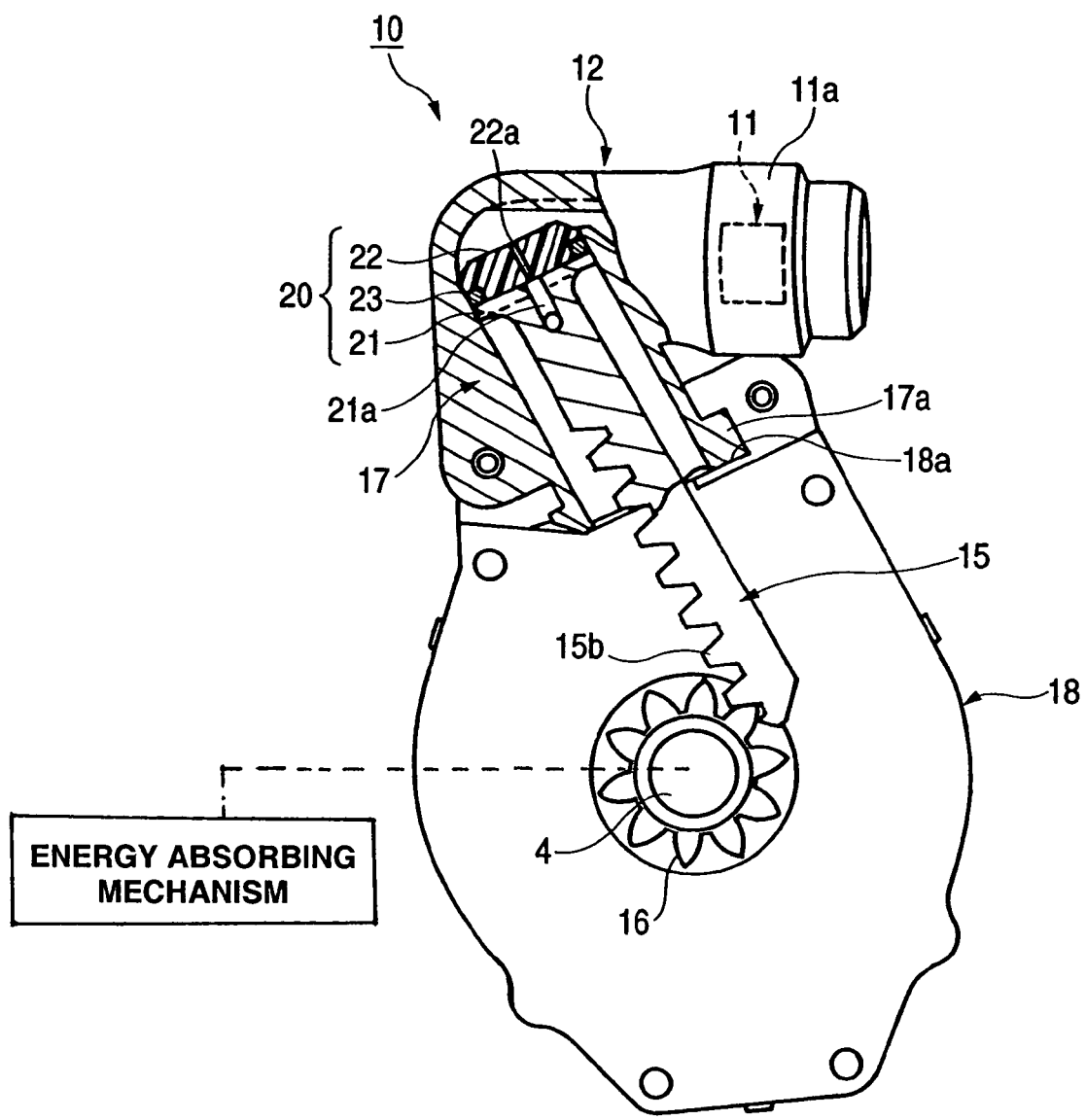
FIG. 2 is a cross-sectional view of the pretensioner in an initial state.

The preferred embodiments of the present invention will be described below with reference to the accompanying drawings. FIG. 1 is an exploded perspective view of a pretensioner 10 in a seat belt device according to a first embodiment of the present invention. FIG. 2 is a cross-sectional view showing an initial state of the pretensioner 10 as shown in FIG. 1.

This pretensioner 10 is equipped in a seat belt retractor for the vehicle such as a car to remove the slack of a belt (webbing) when the vehicle is emergency such as the time of collision. The pretensioner 10 can transmit a torque via a clutch mechanism, not shown, to a winding shaft 4 (see FIG. 2) of the retractor.

This pretensioner 10 conducts a high temperature and high pressure gas generated by a gas generator 11 through a gas generator case 11a covering the gas generator 11 to a cylinder 17. The cylinder 17 has one end (base end) connected to the gas generator case 11a, with the other end being connected via a jaw portion 17a provided at the other end to a lower case (rack gear case) 18 for the pretensioner 10. The jaw portion 17a is fitted with a concave portion 18a of the lower case 18, and links the cylinder 17 to the lower case 18.

A piston 20 is contained movably within the cylinder 17. Herein, the piston 20 comprises a disk-like piston main body 21 formed integrally with the base end of a rack (movement member) 15, a substantially disk-like bush (pressure receiving plate) 22 and a ring-like seal member 23 disposed between the piston main body 21 and the bush 22. The substantially disk-like bush is superposed on the piston main body 21, for transmitting a gas pressure supplied into the cylinder 17 to the piston main body 21. The bush 22 and the piston main body 21 are provided with a first gas passageway 22a and second gas passageway 21a, as will be detailed later.

In this pretensioner 10, a pressure vessel 12 is formed of the gas generator case 11a, the cylinder 17, and the piston 20. The inside of the pressure vessel 12 forms a space filled with the high pressure gas. The pressure vessel 12 is placed on the side at the base end of the rack 15.

The piston 20 partitions the internal space of the cylinder 17, and one of the internal spaces disposed on the side of the gas generator 11 forms the space filled with the high pressure gas.

In this pretensioner 10, the rack 15 stood on the piston main body 21 forms rack teeth 15b. A top end of the rack tooth 15b on the opposite side of the piston main body 21 is mated with a pinion gear 16 in the initial state. When the rack 15 is pressed and moved by a gas pressure, the pinion gear 16 mated with the rack 15 at any time is rotated in a clockwise direction, as shown in the figure. Therefore, the winding shaft 4 of the retractor can be rotated in a direction of removing the slack of the belt. Namely, in this pretensioner 10, driving means for rotating the winding shaft 4 of the retractor in the direction of removing the slack of the belt comprises the rack 15 and the pinion gear 16.

The driving means is not limited to the above form, but may be constituted such that the piston is provided with a pressing member, the pressing member is pressed and moved by gas pressure, and a wire member wound around the winding shaft 4 is pulled by the pressing member to rotate the winding shaft 4.

The pretensioner 10 comprises a planetary gear 14 (see FIG. 1) that is a speed up transmission gear disposed between the pinion gear 16 and a clutch outer ring, not shown, to speed up the rotation of the clutch outer ring by the rotation of the pinion gear 16, and a control device, not shown, for operating the gas generator when the vehicle is in emergency.

In the lower case 18, a central opening 18b for receiving the pinion gear 16 rotatably and a guide groove 18c in communication with the central opening 18b for guiding slidably the rack 15 are formed. A plate-like upper case 18 covering the outside of the lower case 18 is formed with an opening 19a into which the top end of the winding shaft 4 is penetrated.

The retractor with the pretensioner 10 is also equipped with an energy absorbing mechanism for rotating reversely the winding shaft 4 when a tension acting on the belt exceeds a predetermined value, after removing the slack of the belt by a pressure movement of the rack 15, and for torsionally deforming a torsion bar (winding shaft) at this time.

Figure 3A:
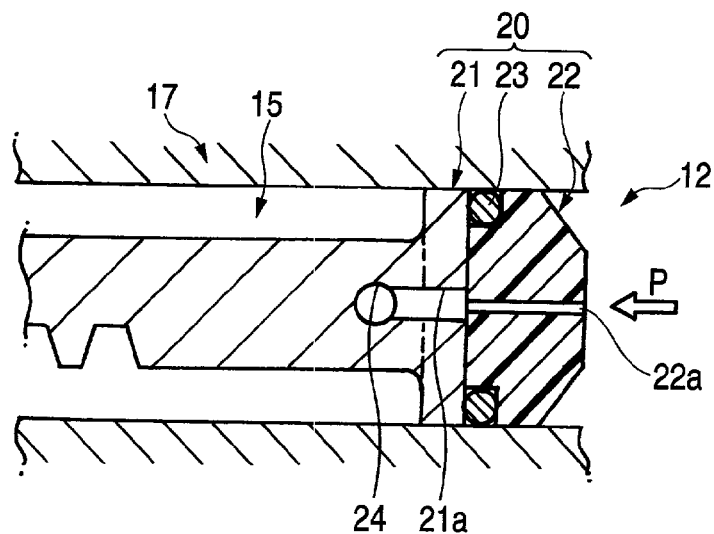
FIGS. 3A to 3C are enlarged cross-sectional views for explaining the operation of the first embodiment.

FIG. 3A is an enlarged view of the piston 20 and its vicinity. The substantially disk-like bush 22 is a deformable member made of metal such as synthetic resin or aluminum. The first gas passageway 22a like a capillary penetrates through the center of the bush 22. The disk-like piston main body 21 is a non-deformable member made of metal such as carbon steel. The second gas passageway 21a like a capillary penetrates through the center of the piston main body 21. The first gas passageway 22a and the second gas passageway 21 extend on the same straight line to penetrate the piston 20. In the initial state, the first gas passageway 22a is slender than the second gas passageway 21a.

For example, the first gas passageway 22a may be a capillary having a diameter of 0.8 to 2 mm, and the second gas passageway 21a may be a capillary having a diameter of 1.5 to 3 mm.

The second gas passageway 21a extends into the inside of the rack 15, and is in communication with a third gas passageway (transverse hole) 24 extending in a direction orthogonal to the movement direction of the rack 15 (transverse direction) The rack 15 is a non-deformable member formed of a metal such as carbon steel. The piston main body 21 and the rack 15 may be the same member. The third gas passageway 24 is in communication with a space (which is an outside of the space filled with high pressure gas) on the opposite side of the gas generator 11 of the internal spaces of the cylinder 17 partitioned by the piston 20.

The ring-like seal member 23 is fitted within a concave portion provided on a face of the bush 22 opposite to the piston main body 21, and carried between the bush 22 and the piston main body 21.

The bush 22 and the piston main body 21 are bonded by adhesive, for example.

The operation of this embodiment will be described below. When the vehicle is in emergency, the pretensioner 10 is activated firstly, a high temperature and high pressure gas is generated from the gas generator 11 to press and move the piston 20 and the rack 15 at high speed to the left as indicated by the arrow P in FIG. 3A. At this time, a part of the high pressure gas tries to pass through the first gas passageway 22a, the second gas passageway 21a and the third gas passageway 24. However, little gas is exhausted out of the third gas passageway 24, since each of the gas passageways 22a, 21a and 24 is formed like a capillary and a viscous resistance acts on the gas. Especially since the first gas passageway 22a is narrower, the gas is prevented from being exhausted out of it. That is, the pressure within the pressure vessel 12 is scarcely lowered.

The period of the time from start to end of the pressure movement of the piston 20 and the rack 14 is extremely short, for example, 10 msec or less. Meanwhile, the winding shaft of the retractor is rotated in a direction of removing the slack of belt.

Figure 3B:
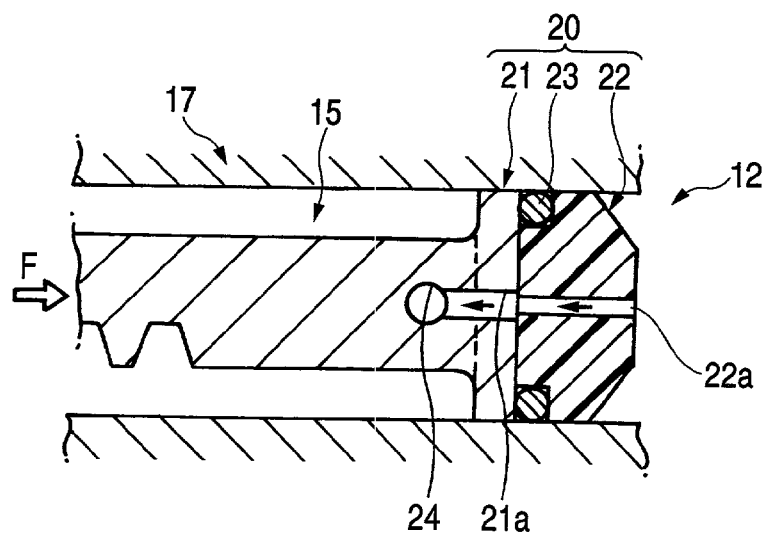

In a short time (e.g., 15 msec) after the pressure movement of the piston 20 and the rack 15 is ended, the energy absorbing mechanism is activated to press and move relatively slowly the piston 20 and the rack 15 to the right as indicated by the arrow F in FIG. 3B. The movement speed at this time is slower than the movement speed when the pretensioner is activated. The period from the time when the pressure movement of the piston 20 and the rack 15 is started till the time when it is ended is from 20 to 60 msec, for example. In the meanwhile, a part of the high pressure gas within the pressure vessel 12 passes through the first gas passageway 22a, the second gas passageway 21a and the third gas passageway 24 and is exhausted. Owing to the high pressure gas that has passed, the bush 22 is melted, so that the first gas passageway 22a is gradually expanded in diameter.

Figure 3C:
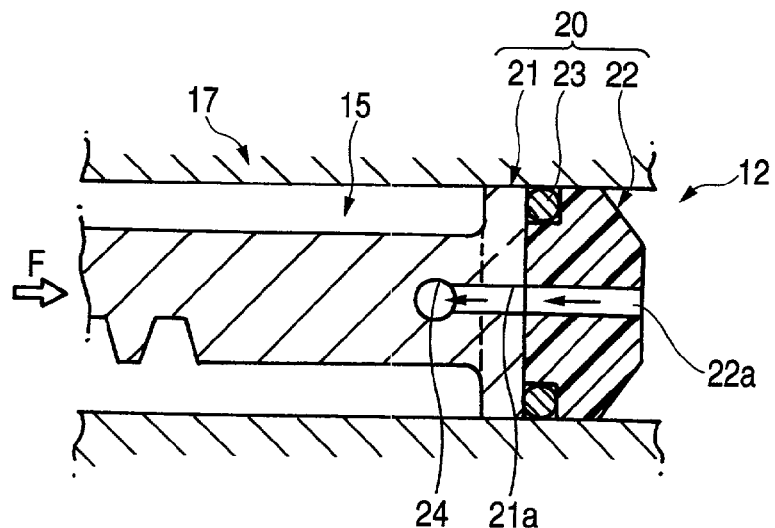

And the first gas passageway 22a is expanded in diameter till the diameter of the first gas passageway 22a is almost equal to the diameter of the second gas passageway 21a, as shown in FIG. 3C.

Figure 4:
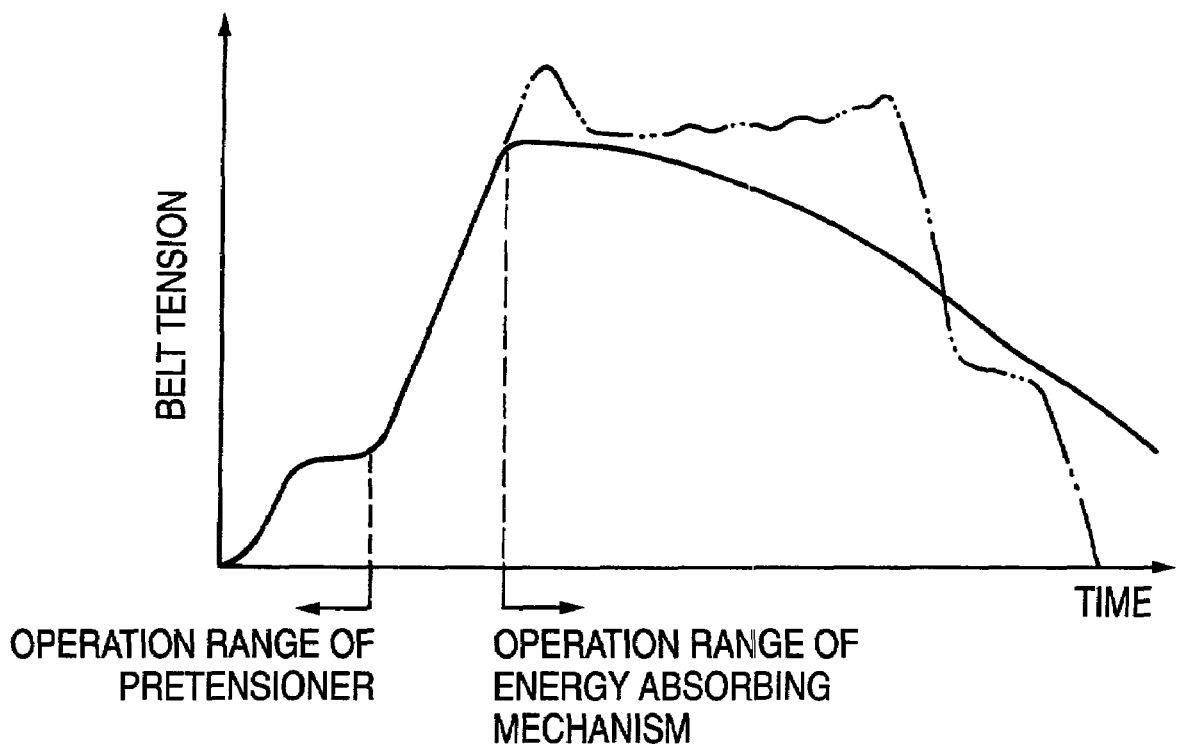
FIG. 4 is a graph representing the effect of this invention.

FIG. 4 is a graph (solid line) representing the relation between the time from the start of activating the pretensioner to the end of activating the energy absorbing mechanism and the tension acting on the belt. In the same figure, a graph representing the relation between the time in the conventional pretensioner and the belt tension is indicated by the two-dot chain line.

As will be seen from FIG. 4, the belt is smoothly drawn out by activating the energy absorbing mechanism in this embodiment. In an active range of the energy absorbing mechanism, the belt tension is lowered gradually (continuously), without sudden change (discontinuous point) in the belt tension.

Figure 5:
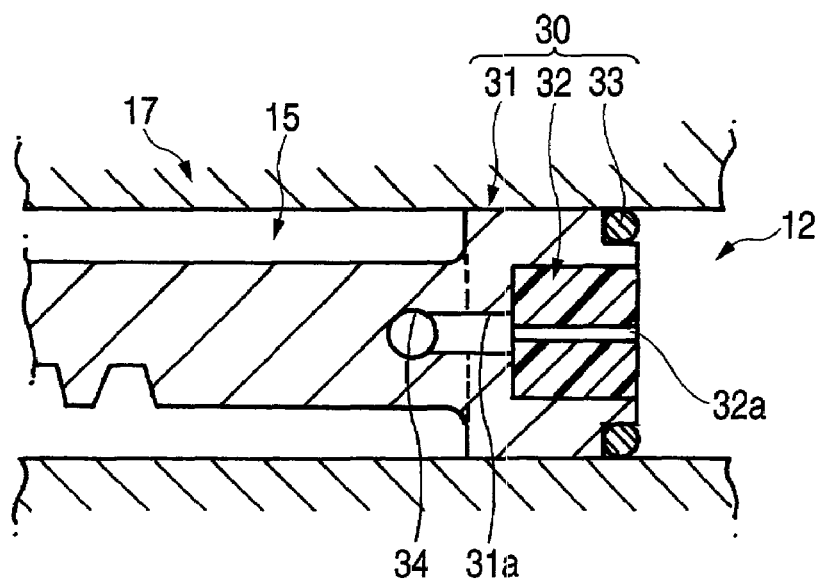
FIG. 5 is a cross-sectional view showing the relevant part of a pretensioner according to a second embodiment of the present invention.

This pretensioner is not degraded functionally than the conventional pretensioner, and the slack of the belt can be removed rapidly in this embodiment, FIG. 5 is a cross-sectional view showing the relevant part of a pretensioner in a seat belt device according to a second embodiment of the present invention. The same or like parts in constitution or operation are designated by the same or like numerals or signs as described above, and the description of such parts is simplified or omitted. Also, the constitution not shown is the same as in the first embodiment.

In this second embodiment, the entire bush 32 that is a deformable member is fitted into a piston main body 31 formed integrally at the base end of the rack 15 that is a non-deformable member. A ring-like seal member 33 is fitted within a concave portion provided on a face of the piston main body 31 opposite to the pressure vessel 12. The bush 32 is formed almost cylindrically, and has a first gas passageway 32a like a capillary passing through its central axis.

The second gas passageway 31a like a capillary passes penetrates through the center of the cylindrical piston main body 31 which has a bottom. The first gas passageway 32a and the second gas passageway 31a extend on the same straight line, and penetrate the piston 30. In an initial state, the first gas passageway 32a is slender than the second gas passageway 31a, and, for example, is a capillary having the same diameter of the first embodiment.

The second gas passageway 31a extends into the rack 15, and is in communication with a third gas passageway (transverse hole) 34.

With the above constitution, the bush 32 and the piston main body 31 can be connected easily and securely.

Figure 6:
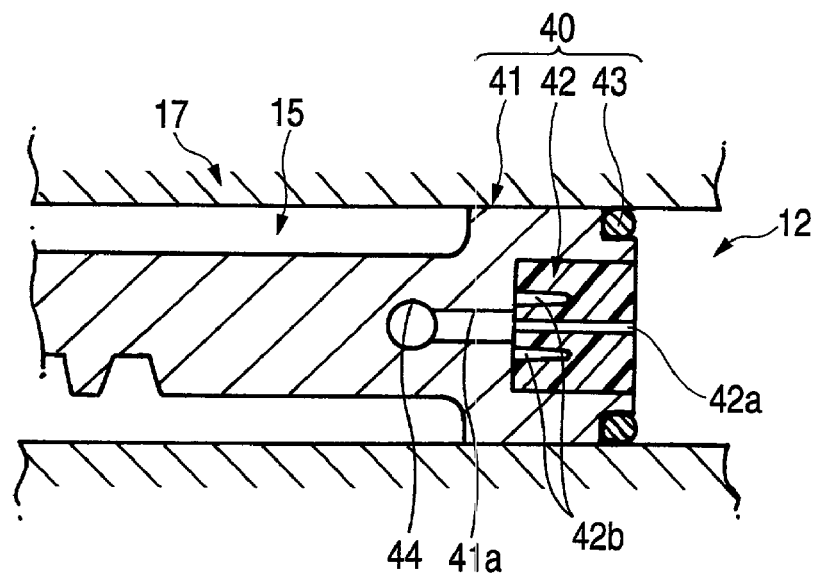
FIG. 6 is a cross-sectional view showing the relevant part of a pretensioner according to a third embodiment of the present invention.

FIG. 6 is a cross-sectional view showing the relevant part of a pretensioner in a seat belt: device according to a third embodiment of the present invention.

In this third embodiment, the entire bush 42 that is a deformable member is fitted into a piston main body 41 formed integrally at the base end of the rack 15 that is a non-deformable member. A ring-like seal member 43 is fitted within a concave portion provided on a face of the piston main body 41 opposite to the pressure vessel 12.

The bush 42 is formed almost cylindrically, and has a first gas passageway 42a like a capillary passing through its central axis. Further, the bush 42 has a lightening hole 42b as an auxiliary space formed at an interval radially from the first gas passageway 42a. A plurality of lightening holes 42b maybe provided at regular intervals circumferentially, or like a ring. In this embodiment, the lightening hole 42b is in communication with none of the first gas passageway 42a, the second gas passageway 41a, the third gas passageway 44 and the outside in the initial state. However, the lightening hole 42b is not limited to the above form, but may communicate with other passageways or the outside unless it communicates with the first gas passageway 42a.

With the above constitution, the first gas passageway 42a is expanded in diameter as the high pressure gas is exhausted, and at the time of communicating to the lightning hole 42b, the exhaust of gas is accelerated. In this manner, the residual pressure of the pressure vessel 12 can be decreased smoothly.

Figure 7:
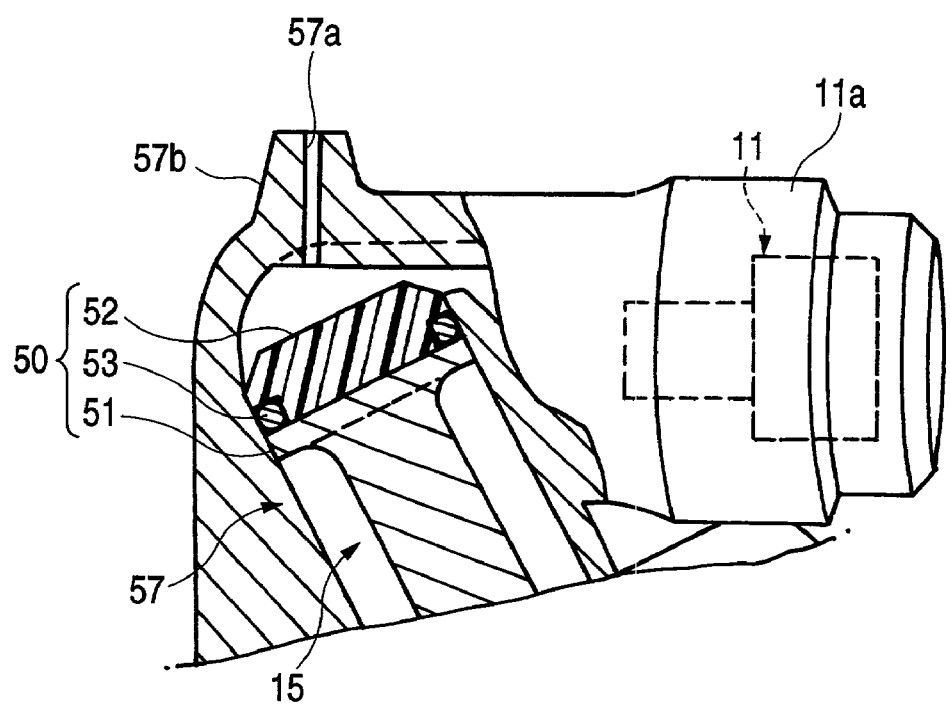
FIG. 7 is a cross-sectional view showing the relevant part of a pretensioner according to a fourth embodiment of the present invention.

FIG. 7 is a cross-sectional view showing the relevant part of a pretensioner in a seat belt device according to a fourth embodiment of the present invention.

In this embodiment, no gas passageway is formed in a piston main body 51 formed integrally at the base end of the rack 15 that is a non-deformable member or a bush 52 superposed on the piston main body 51, and a gas passageway 57a is formed through a cylinder 57. The gas passageway 57a is disposed on the side at the base end of the rack 15 and the piston 50 to make a space filled with high pressure gas communicable with the outside. The cylinder 57 may be formed of a deformable material such as aluminum totally, or only around the gas passageway 57a. If a portion around the gas passageway 57a is a convex portion 57b protruded from the cylinder 57, a certain length of the gas passageway 57a can be kept to utilize the viscous resistance of gas fully, when the pretensioner is activated.

And when the energy absorbing mechanism is activated, the gas passageway 57a is gradually expanded.

The present invention is not limited to the above embodiments, but may be varied or modified in various ways.

For instance, the gas generator 11 may generate a high temperature and high pressure gas when ignited, or employ a high pressure gas bomb.

The above embodiments may be combined suitably.

As described above, this invention can provide a seat belt device having improved functions of pretensioner and energy absorbing mechanism and with no greater size.

What is claimed is:

1. A seat belt device comprising:
    a gas generator for generating a high pressure gas when a vehicle is in emergency;
    a cylinder for conducting the high pressure gas from the gas generator;
    a piston received movably within the cylinder and pressed and moved by the high temperature and pressure gas;
    a drive unit for rotating a winding shaft of a seat belt retractor in a direction of removing a slack of a belt, using the movement of the piston;
    an energy absorbing mechanism, for reversely rotating the winding shaft when a tension acting on the belt exceeds a predetermined value after removing the slack of the belt; and
    a venting mechanism having a gas passageway for exhausting the high temperature and pressure gas from a space filled with the high temperature and pressure gas to the outside of the space, wherein gas passageway exists before said gas generator generates said high temperature and pressure gas, and
    wherein at least a part of the gas passageway that is made of synthetic resin gradually melts and expands as the high temperature and pressure gas is exhausted.

2. The seat belt device as set forth in claim 1, wherein the gas passageway is partitioned by a deformable member at least a part of which melts or breaks away as the high pressure gas is exhausted.

3. The seat belt device as set forth in claim 2, wherein the venting mechanism has an auxiliary space, wherein the auxiliary space is cut off from the gas passageway before expansion of the gas passageway, and communicates with the gas passageway as the gas passageway expands.

4. The seat belt device as set forth in claim 3, the venting mechanism having a deformable member provided with a first gas passageway that is expanded as the high temperature and pressure gas is exhausted, and a non-deformable member provided with a second gas passageway that remains an initial size of the second gas passageway as the high temperature and pressure gas is exhausted.

5. The seat belt device as set forth in claim 4, wherein the venting mechanism is disposed on the piston so that the first gas passageway and the second gas passageway extend on the same straight line to penetrate the piston along a movement direction of the piston.

6. The seat belt device as set forth in claim 5, wherein an initial size of the first gas passageway is narrower than a size of the second gas passageway before the first gas passageway is expanded.

7. The seat belt device as set forth in claim 6, wherein at least a part of the deformable member is fitted into the inside of the non-deformable member.

8. The seat belt device as set forth in claim 1, wherein the venting mechanism has an auxiliary space, wherein the auxiliary space is cut off from the gas passageway before expansion of the gas passageway, and communicates with the gas passageway as the gas passageway expands.

9. The seat belt device as set forth in claim 1, the venting mechanism having a deformable member provided with a first gas passageway that is expanded as the high pressure gas and pressure gas is exhausted, and a non-deformable member provided with a second gas passageway that remains an initial size of the second gas passageway as the high temperature and pressure gas is exhausted.

10. The seat belt device as set forth in claim 9, wherein the venting mechanism is disposed on the piston so that the first gas passageway and the second gas passageway extend on the same straight line to penetrate the piston along a movement direction of the piston.

11. The seat belt device as set forth in claim 9, wherein an initial size of the first gas passageway is narrower than a size of the second gas passageway before the first gas passageway is expanded.

12. The seat belt device as set forth in claim 11, wherein at least a part of the deformable member is fitted into the inside of the non-deformable member.

* * * * *